United States Patent
Hurley et al.

(10) Patent No.: US 9,568,691 B2
(45) Date of Patent: Feb. 14, 2017

(54) DURABLE OPTICAL FIBER AND CONNECTOR ASSEMBLY

(71) Applicant: Corning Cable Systems LLC, Hickory, NC (US)

(72) Inventors: William Carl Hurley, Hickory, NC (US); Eric Raymond Logan, Hickory, NC (US); Mark Tracy Paap, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 597 days.

(21) Appl. No.: 13/915,904

(22) Filed: Jun. 12, 2013

(65) Prior Publication Data

US 2014/0369657 A1    Dec. 18, 2014

(51) Int. Cl.
*G02B 6/42* (2006.01)
*G02B 6/38* (2006.01)

(52) U.S. Cl.
CPC ........... *G02B 6/4246* (2013.01); *G02B 6/3885* (2013.01); *G02B 6/425* (2013.01); *G02B 6/4292* (2013.01); *Y10T 29/49826* (2015.01)

(58) Field of Classification Search
CPC ..... G02B 6/4403; G02B 6/448; G02B 6/4246; G02B 6/3885; G02B 6/4292; G02B 6/425; G02B 6/4404; G02B 6/4409; G02B 6/4498
USPC ........................................................ 385/114
See application file for complete search history.

(56) References Cited

U.S. PATENT DOCUMENTS

| | | | |
|---|---|---|---|
| 6,498,882 B1 * | 12/2002 | Buckelew | G02B 6/3636 385/114 |
| 6,712,527 B1 * | 3/2004 | Chan | G02B 6/4201 385/88 |
| 6,905,257 B2 * | 6/2005 | Eichenberger et al. | 385/89 |
| 7,021,837 B2 | 4/2006 | Eichenberger et al. | |
| 2003/0016924 A1 * | 1/2003 | Thompson | G02B 6/4482 385/114 |
| 2013/0294732 A1 * | 11/2013 | Li | G02B 6/4219 385/83 |

FOREIGN PATENT DOCUMENTS

WO    WO2011/044031 A1    4/2011 ............... G02B 6/44

OTHER PUBLICATIONS

Corning Cable Systems, SRP-004-098, Issue 10, Jun. 2008.

* cited by examiner

*Primary Examiner* — John M Bedtelyon
(74) *Attorney, Agent, or Firm* — William D. Doyle

(57) ABSTRACT

An optical fiber assembly including an optical fiber ribbon and an optical connector is provided. The optical fiber ribbon includes a ribbon matrix, a first group of optical fibers embedded in the ribbon matrix, a second group of optical fibers embedded in the ribbon matrix, and a split in the ribbon matrix at a first end of the ribbon forming a space between a first end of the first group of optical fibers and a first end of the second group of optical fibers. The optical connector includes a body, a first array of openings defined in the body, and a second array of openings defined in the body. The second array is spaced from the first array. The bond between the ribbon matrix and the optical fibers prevents elongation of the split.

21 Claims, 3 Drawing Sheets

DURABLE OPTICAL FIBER AND CONNECTOR ASSEMBLY

BACKGROUND

The disclosure relates generally to optical fibers and more particularly to optical fiber connectors and related optical fiber ribbons. Optical fibers have seen increased use in a wide variety of electronics and telecommunications fields. Optical fibers can be connected to an optical connector and its components (e.g., a ferrule). The connector is then connected to the appropriate electronics (e.g., a circuit board including diode arrays) to precisely position the optical fibers relative to the diode arrays such that light signals within the fiber are transmitted or received properly for the diode arrays.

SUMMARY

One embodiment of the disclosure relates to an optical fiber assembly including an optical fiber ribbon and an optical connector. The optical fiber ribbon includes a ribbon matrix, a first group of optical fibers embedded in the ribbon matrix, a second group of optical fibers embedded in the ribbon matrix, and a split in the ribbon matrix at a first end of the ribbon forming a space between a first end of the first group of optical fibers and a first end of the second group of optical fibers. The optical connector includes a body, a first array of openings defined in the body, and a second array of openings defined in the body. The second array is spaced from the first array. A bond between the ribbon matrix and the optical fibers prevents elongation of the split.

An additional embodiment of the disclosure relates to an optical fiber assembly including an optical fiber ribbon and an optical connector. The optical fiber ribbon includes a first end, a second end, a ribbon body, a first fiber embedded in the ribbon body and extending from the first end to the second end, a second fiber embedded in the ribbon body and extending from the first end to the second end, and a split in the ribbon body extending along a portion of the length of the ribbon from the first end toward the second end of the ribbon. The split has an inner terminus located between the first and second ends of the ribbon, and the split is located between the first fiber and the second fiber forming a gap between the first fiber and the second fiber at the first end of the ribbon. The optical connector includes a body including an outer surface, a first fiber receiving passage defined in the body and extending inward from the outer surface into the optical connector, and a second fiber receiving passage defined in the body and extending inward from the outer surface into the optical connector. The first fiber is received within the first fiber receiving passage, and the second fiber is received within the second fiber receiving passage. The inner terminus of the split is located outside of the body of the optical connector.

An additional embodiment of the disclosure relates to a connecting assembly for connecting optical fibers to a circuit board including a transmit diode array and a receive diode array and located within a housing. The connecting assembly includes an optical connector and an optical fiber ribbon. The optical connector includes a body including a first outer surface and a second outer surface, a first array of openings defined in the body and formed through the first outer surface of the body, and a second array of openings defined in the body and formed through the first outer surface of the body. The second array is spaced from the first array defining a separation distance. The optical connector is configured to be connected to the circuit board such that the second outer surface of the body faces the transmit diode array and the receive diode array. The optical fiber ribbon includes a first end, a second end, a ribbon body, a first group of a plurality of optical fibers embedded in the ribbon body, a second group of a plurality of optical fibers embedded in the ribbon body, and a split in the ribbon body extending along a portion of the length of the ribbon from the first end toward the second end. Each optical fiber of the first group is received within an opening of the first array of openings, and each optical fiber of the second group is received within an opening of the second array of openings. The split is located between the first and second groups of optical fibers forming a gap therebetween, and the split has an inner terminus located between the first and second ends of the ribbon. The split allows the first group of optical fibers to align with the first array of openings and the second group of optical fibers to align with the second array of openings. The first array of openings and the second array of openings are located between the second surface of the body and the inner terminus of the split.

An additional embodiment of the disclosure relates to a method of connecting an optical fiber ribbon to a circuit board. The method includes providing an optical fiber ribbon including a plurality of parallel fibers embedded in a ribbon matrix. The method includes splitting the optical fiber ribbon lengthwise from a first end along a portion of the length of the ribbon, such that the first end of the ribbon is separated into a first group of fibers and a second group of fibers, and an inner split terminus is formed between the first end and the second end of the ribbon. The method includes providing an optical connector including a body, a first outer surface and a second outer surface and a plurality of passages formed through the first outer surface and extending into the body. The method includes moving the first end of the first group of fibers away from the first end of the second group of fibers such that a gap is formed between the first and second group of fibers. The method includes inserting the first ends of the first group and second group of fibers into the plurality of passages of the optical connector. The method includes connecting the optical connector to a circuit board comprising a diode array such that the second surface of the connector faces the diode array and such that the optical connector is positioned between the diode array and the inner split terminus.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical fiber ribbon and connector assembly are shown. In general, the connector includes at least two ports or openings formed in the connector for receiving optical fibers. One of the connectors discussed herein is an on-board connector configured to be connected to a circuit board within a housing. The on-board connector is mounted to the circuit board adjacent the diode arrays (e.g., the transmit and receive diode arrays) such that the optical fibers are properly positioned relative to the arrays to communicate light to and from the diode arrays. Due to space and size limitations, the diode arrays are spaced apart from each other on the circuit board, and the ports of the on-board connector are spaced apart such that the optical fibers once received in the appropriate port are positioned properly relative to the diode arrays. In general, the optical fiber ribbon of the present application is split at the end of the ribbon that connects to the on-board connector.

The split separates the optical fiber ribbon into a first group of optical fibers (e.g., a transmit group of optical fibers) and a second group of optical fibers (e.g., a receive group of fibers) and provides the needed spacing between the two groups to properly align with the ports of the on-board connector. In the embodiments discussed herein, the split of the optical fiber ribbon is located outside of the on-board connector, and the ribbon is configured such that the position or length of the split is maintained (e.g., propagation of the split along the length of the ribbon is maintained) without a support structure or other restraint. Because the split of the optical fiber ribbon is maintained outside the connector without the need for connecting of additional support structures to the ribbon, assembly of the optical fiber ribbon to the connector may be streamlined.

In various embodiments discussed herein, the optical fiber ribbon includes a durable ribbon matrix that binds to the fibers with sufficient strength to prevent the split from propagating along the length of the ribbon. Further, the optical fiber ribbon discussed herein may include one or more indicators (e.g., color coded fiber arrangements) to identify where the ribbon is to be split. The indicators of the fiber ribbon allow the assembler to precisely split the optical fiber ribbon into the first and second group of fibers.

Figure 1:
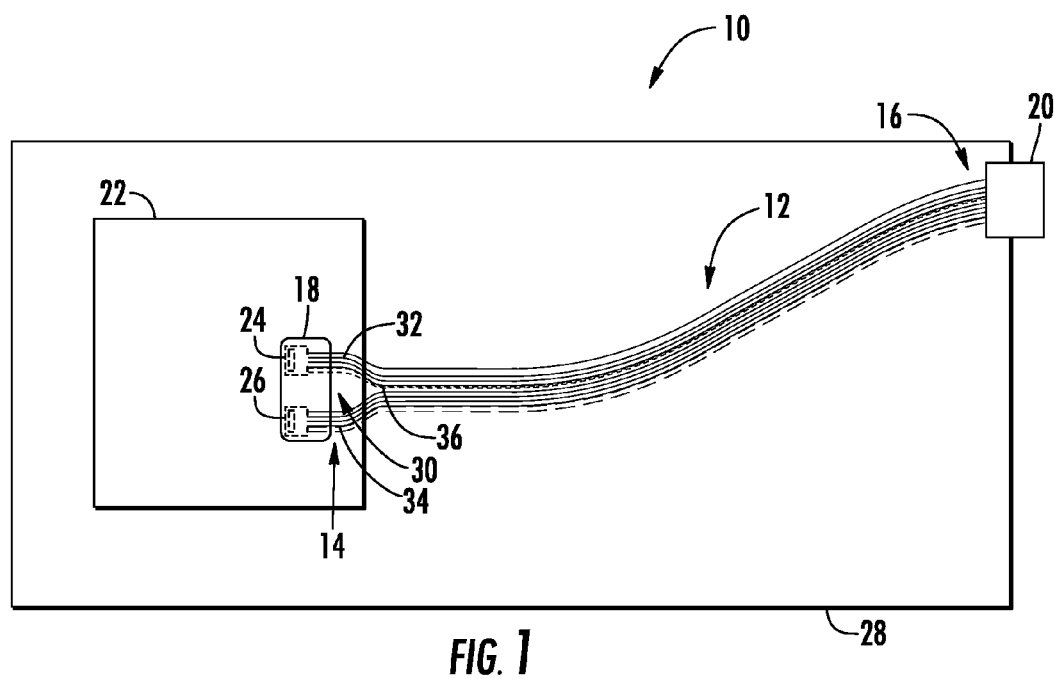
FIG. 1 shows an optical fiber assembly according to an exemplary embodiment.

Referring to FIG. 1, an optical fiber assembly 10 is shown according to an exemplary embodiment. Optical fiber assembly 10 includes an optical fiber ribbon 12. Ribbon 12 includes a first end 14 and a second end 16. First end 14 of ribbon 12 is connected to an optical connector, shown as on-board ferrule or connector 18, and second end 16 of ribbon 12 is connected to a second connector 20.

On-board connector 18 is connected to a circuit board 22. In the embodiment shown, circuit board 22 is a printed circuit board that includes a first diode array, shown as transmit diode array 24, and a second diode array, shown as receive diode array 26 (both shown by broken lines beneath connector 18). Ribbon 12, on-board connector 18 and printed circuit board 22 are located within a housing, shown as equipment housing 28. Equipment housing 28 is the housing structure that supports the components of assembly 10. In one embodiment, second connector 20 is a multi-fiber optical connector, for example, an MPO-connector that extends from the inside of housing 28 to the outside of housing 28 and provides a point at which assembly 10 may be connected into an electronics or communication system.

As shown in FIG. 1, transmit diode array 24 is spaced apart from receive diode array 26 on printed circuit board 22. As explained in more detail below, first end 14 of ribbon 12 includes a split 30 which separates ribbon 12 into a first group of fibers, shown as transmit fiber group 32, and a second group of fibers, shown as receive fiber group 34. Split 30 provides a gap or spatial separation that allows fiber groups 32 and 34 to be received properly within the ports of on-board connector 18 and to properly align the fibers with the diode arrays 24 and 26. In the embodiment shown, ribbon 12 is not split at end 16 connected to second connector 20.

As shown, split 30 extends only a portion of the axial length along ribbon 12 such that split 30 extends from on-board connector 18 to inner terminus 36 of split 30 such that inner terminus 36 is located between first end 14 and second end 16 of ribbon 12. The axial length of split 30 may be selected to allow for ribbon 12 to be properly connected to on-board connector 18. In various embodiments, the axial length of split 30 from on-board connector 18 to inner terminus 36 is between 25 mm and 200 mm, specifically between 50 mm and 150 mm, and more specifically, between 75 mm and 125 mm. In a specific embodiment, the axial length of split 30 from on-board connector 18 to inner terminus 36 is about 100 mm. Inner terminus 36 is located outside of on-board connector 18 and is located within housing 28. In one embodiment, split portion 30 of ribbon 12 and in particular inner terminus 36 is unsupported within housing 28 in that ribbon assembly does not include an additional structure configured to engage, support or restrain ribbon 12 to prevent split 30 from propagating along the length of ribbon 12. In specific embodiments, as discussed below, ribbon 12 includes a durable ribbon matrix that bonds to the fibers of ribbon 12 with sufficient strength such that split 30 does not propagate during various steps, such as shipping, handling and/or installation of the connector or under the weight of the ribbon following installation.

Figure 2:
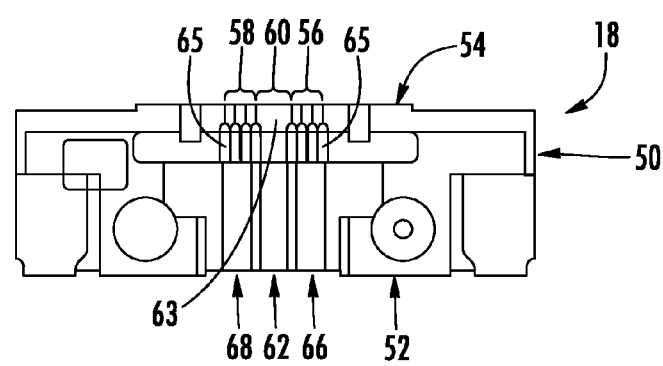
FIG. 2 shows an optical connector according to an exemplary embodiment.

Referring to FIG. 2, a detailed view of on-board connector 18 is shown. Connector 18 includes a body 50. Generally, body 50 is the structure of connector 18 that provides structure and support for the various components of connector 18 discussed herein. Body 50 includes a first outer surface, shown as front surface 52, and a second outer surface, shown as diode facing surface 54. Connector 18 includes a first array of openings, shown as openings 56, and a second array of openings, shown as openings 58. Openings 56 and openings 58 are defined within connector body 50 and are located at the inner ends of ribbon receiving passages 66 and 68 within connector body 50. In this arrangement, ribbon receiving passages 66 and 68 extend inwardly from surface 52 into connector body 50 to meet fiber-sized openings 56 and 58, and openings 56 and openings 58 are openings forming the entrance to fiber receiving passages defined within body 50 of connector 18. Thus, each fiber receiving passage of connector 18 begins with an opening 56 or 58 and extends inward from ribbon receiving passages 66 and 68 into body 50 of connector 18, and as shown in detail in FIG. 3, each opening 56 and 58 and each associated fiber receiving passage receives one of the fibers of ribbon 12. As shown best in FIG. 3, each ribbon receiving passage 66 and 68 is sized to receive fiber groups 32 and 34, respectively, as fiber groups 32 and 34 enter connector body 50. In this arrangement, ribbon receiving passage 66 and 68 act to align the fibers of each group with openings 56 and 58, respectively, such that each fiber is received within the appropriate fiber receiving passage.

Surface 54 is the surface of connector 18 that faces circuit board 22 when connector 18 is connected to circuit board 22. Thus, in this arrangement, surface 54 faces both transmit diode array 24 and receive diode array 26 when connector 18 is connected to board 22. It should be understood that while FIG. 2 shows ribbon receiving passages 66 and 68 formed through a front surface of connector 18 and also shows surface 54 as the surface that faces the diode arrays in the orientation of FIG. 2, connector 18 may be formed in any manner that allows the optical fibers to be connected to the connector and properly positioned relative to the diode arrays of circuit board 22. For example, in one embodiment, openings 56 and 58 may be formed in an upper surface of connector body 50 and a lateral surface (such as front surface 52) may face the diode arrays when mounted to circuit board 22. In another example, connector 18 may contain optical elements such as lenses or prisms molded into connector body 50 to direct or focus the light on the detector array. In this instance, openings 56 and 58 would terminate at a fiber stop plane rather than at surface of the connector body, and the optical element directs light to and from each optical fiber.

As shown in FIG. 2, openings 56 and 58 are separated or spaced apart by a space, separation distance, or gap 60. As shown, gap 60 is positioned between the inner edges of the innermost opening of openings 56 and 58 respectively. Gap 60 also defines the lateral spacing or separation distance between inner edges of ribbon receiving passages 66 and 68. Thus, in this embodiment, connector body 50 includes a wall portion 62 (e.g., a portion of surface 52) located between and defining the separation distance between ribbon receiving passages 66 and 68 and includes a wall portion 63 located between and defining the separation distance between openings 56 and 58.

Figure 3:
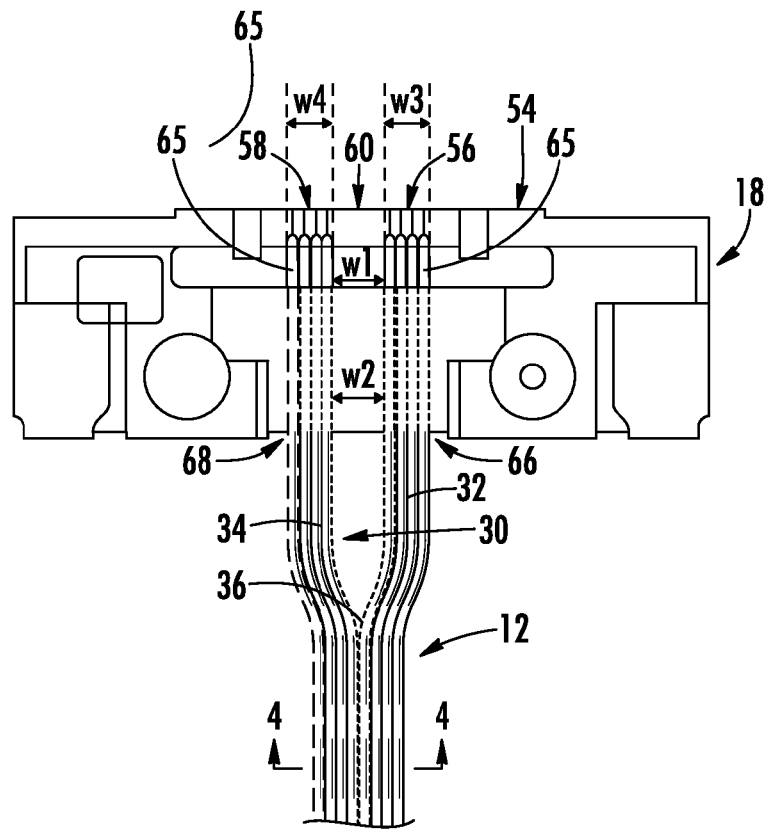
FIG. 3 shows an optical fiber ribbon connected to an optical connector according to an exemplary embodiment.

Referring to FIG. 3, ribbon 12 and connector 18 are shown connected together. In the embodiment shown, ribbon 12 includes eight optical fibers and split 30 is located between the fourth and fifth optical fibers such that fiber groups 32 and 34 each include four fibers. Further in this arrangement, opening arrays 56 and 58 each include four openings and four fiber receiving passages 65 positioned to receive the four fibers of fiber groups 32 and 34. In other embodiments, ribbon 12 may include various numbers of fibers (e.g., 2, 4, 6, 12, 16, 24, 32, etc.), and connector 18 includes the corresponding number of openings so that each fiber has an opening.

As shown in FIG. 3, split 30 formed between fiber groups 32 and 34 provides the separation (e.g., lateral or horizontal spacing in the orientation of FIG. 3) that allows fiber groups 32 and 34 to align properly with ribbon receiving passages 66 and 68 that guides each fiber into opening arrays 56 and 58 and into fiber receiving passages 65, respectively. Thus, the lateral dimension or separation distance between opening arrays 56 and 58 and between ribbon receiving passages 66 and 68, shown as W1, is substantially the same as the lateral dimension or separation distance between inner most fibers of fiber groups 32 and 34, shown as W2, created by split 30. As will be understood, W1, and consequently W2, typically also relates to the separation distance between the transmit and receive diode arrays on circuit board 22.

In various embodiments, W1 and W2 are substantially the same as each other (e.g., within 10% of each other), and in such embodiments, W1 and W2 are greater than 0.5 mm, specifically are between 1 mm and 3 mm, more specifically between 1.5 mm and 2.5 mm and even more specifically between 1.75 mm and 2.25 mm. In other embodiments, W1 and W2 are between 1.8 mm and 2.1 mm, specifically between 1.9 mm and 2 mm, and more specifically are 1.95 mm.

Further, opening array 56 has a lateral dimension or width, shown as W3, and opening array 58 has a lateral dimension or width, shown as W4. W3 and W4 are generally the lateral distance between the outer most edge and inner most edge of the outer most and inner most openings of each array. W3 and W4 each are the width of each opening of the respective opening array and the width of each portion of body 50 located between the openings. In the embodiment shown, W3 and W4 are substantially the same as each other (e.g., within 1% of each other). In various embodiments, W3 and W4 are between 0.25 mm and 1.25 mm, specifically between 0.35 mm and 1.15 mm and more specifically between 0.45 mm and 1.05 mm. In other embodiments, W3 and W4 are between 0.5 mm and 1.0 mm, specifically between 0.6 mm and 0.9 mm and more specifically between 0.7 mm and 0.8 mm. In a specific embodiment, W3 and W4 are 0.75 mm. In a specific embodiment in which fiber groups 32 and 34 include four fibers each, W3 and W4, are between 1.000 mm and 1.005 mm. In another embodiment, W3 and W4, are sized based on the width of the optical fibers being received, and in one embodiment W3 and W4 are about 0.250 mm (plus or minus 0.001 mm) times the number of fibers in groups 32 and 34, respectively.

In various embodiments, the separation distance between opening arrays 56 and 58 and fiber groups 32 and 34 are sized relative to the widths of opening arrays 56 and 58 such that the fibers of ribbon 12 properly align with the diode arrays when connected to connector 18. In various embodiments, W1 and W2 are between 1.2 times and 4 times greater than W3 and W4, specifically between 1.5 times and 3.7 times greater than W3 and W4, and more specifically between 2.0 times and 3.2 times greater than W3 and W4. In more specific embodiments, W1 and W2 are between 2.5 times and 2.7 times greater than W3 and W4, and more specifically are 2.6 times greater than W3 and W4.

As shown in FIG. 3, split terminus 36 is located outside of connector 18. Thus, opening arrays 56 and 58 are located between the surface of connector 18 configured to face the diode arrays (e.g., surface 54 of connector 18) and split terminus 36. It should be understood that in this embodiment, the relative positioning of portions of connector assembly 10 may be described in relation to the light path within fibers of ribbon 12 or the spatial relation along any of the three orthogonal axes within equipment housing 28.

Further as shown, the portion of ribbon 12 adjacent split terminus 36 is unsupported outside of connector 18. For example, in the embodiment shown, connector assembly 10 does not include a structure external to ribbon 12 (e.g., a clip, band, tape, etc.) that engages ribbon 12 below split terminus 36 (e.g., between split terminus 36 and second end 16 of ribbon 12) that acts to physically restrain the propagation of split 30 along ribbon 12. In various embodiments, ribbon 12 itself includes a structure or layer of material with sufficient strength to resist or prevent split propagation during installation or under the weight of ribbon 12 within equipment housing 28 following connecting of ribbon 12 to connectors 18 and 20. Thus, in various embodiments, the separation strength is the strength of the ribbon matrix of ribbon 12 at inner terminus 36 of split 30 to prevent or resist split propagation. In one embodiment, the separation strength of ribbon 12 (e.g., the force required to be applied to the fiber groups perpendicular to the axial length of the split to cause the split to propagate) may be greater than 0.08 N. In various embodiments, the separation strength of ribbon 12 may be between 0.8 N and 8 N, specifically between 0.8 N and 4 N and more specifically may be between 0.8 N and 2 N. In specific embodiments, the separation strength of ribbon 12 may be between 1 N and 3 N, specifically between 1 N and 2 N, more specifically between 1.6 N and 1.8 N and even more specifically may be about 1.71 N. In various embodiments, the separation strength described herein is measured using the methodology described in Telcordia GR20 Issue 2, July 1998, Section 5.2.2; Requirement R5-4, R5-5, R5-6 and R5-7.

Figure 4:
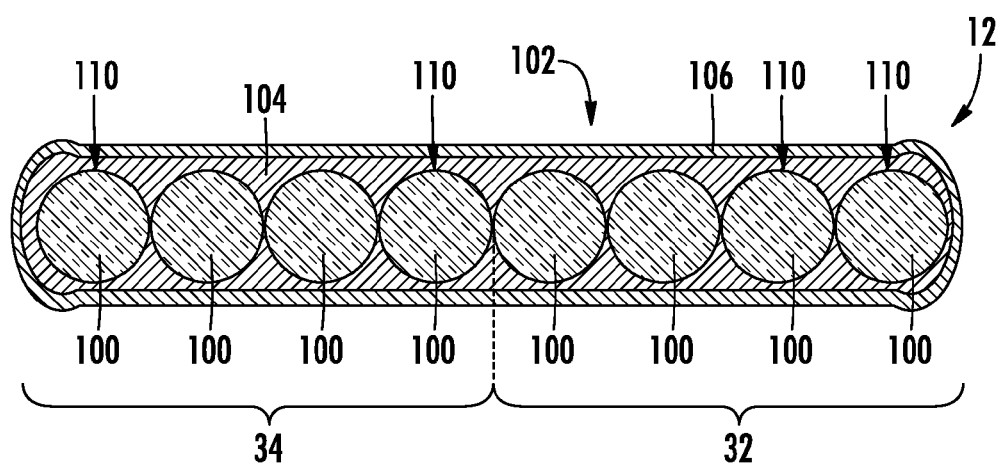
FIG. 4 shows a cross-section of an optical fiber ribbon according to an exemplary embodiment.

Referring to FIG. 4, a cross-section of optical fiber ribbon 12 is shown according to an exemplary embodiment. In this embodiment, optical fiber ribbon 12 is configured to resist or prevent propagation of split 30, as discussed above. Specifically, optical fiber ribbon 12 includes ribbon matrix materials that tightly are bonded to the optical fibers such that split 30 will resist or prevent propagation as discussed above.

As shown in FIG. 4, ribbon 12 includes a plurality of substantially aligned optical fibers 100 that are surrounded by and embedded within a ribbon body, shown as ribbon matrix 102. Each of the optical fibers 100 is generally a flexible transparent optical fiber including one or more coatings. Generally, ribbon matrix 102 is the material that supports and protects optical fibers 100 during installation and operation within equipment housing 28. The ribbon matrix 102 can be either a single layer matrix or a dual layer matrix (made of inner and outer matrix materials). In the embodiment shown in FIG. 4, the matrix 102 includes an inner matrix 104 and an outer matrix 106. The inner matrix 104 surrounds optical fibers 100, and the outer matrix 106 surrounds and contacts an outer surface of the inner matrix 104. In one embodiment, ribbon 12 may be a buffered ribbon that includes an additional outer layer of strengthening material, such as a PVC, that provides additional strength and resistance to the propagation of split 30.

Each of the optical fibers 100 includes a colored ink coating layer 110 to allow for identification of optical fibers 100 of ribbon 12. As explained in more detail below, coloring of the first fiber (leftmost fiber in FIG. 4) and on the fifth fiber (leftmost fiber of fiber group 32) is selected to allow for proper orientation of ribbon 12 relative to connector 18 and to allow the installer to properly identify the space between the fourth and fifth fiber to create split 30 in the proper position. In addition, in one embodiment, the bond between the ink layers on the fibers and the matrix is created such that the bond acts to resist or prevent split propagation during installation or under the weight of ribbon 12 within equipment housing 28 following connecting of ribbon 12 to connectors 18 and 20. Thus, in this manner ribbon 12 allows first end 14 of ribbon 12 to be split and does not require additional restraint structures or assembly steps to resist or prevent split propagation.

In one embodiment, ink layers having the proper bond strength are cured in an environment having an $O_2$ content in an amount of at least about 1000 ppm. The ink composition used to color the fibers can be, for example, ink compositions as described in U.S. Pat. Nos. 7,257,299 and 7,289,706 of Corning Incorporated, which are incorporated herein by reference in their entireties. Other ink compositions are also suitable. The ink can be applied at a thickness in the range of, for example, from about 1 to about 10 microns, or more specifically, in the range of from about 2.5 to about 7 microns. Various embodiments and formation methods of ribbon 12 are described in International Publication No. WO 2011/044031, of Corning Cable Systems LLC, which is incorporated herein by reference in its entirety.

In various embodiments, the thickness (e.g., the dimension of ribbon 12 perpendicular to width of the fiber array, the vertical cross-sectional dimension in the orientation of FIG. 4, etc.) of ribbon matrix 102 is such that ribbon 12 resists split propagation as discussed above. In various embodiments, the thickness of the ribbon matrix (in combination with the fiber to matrix bond) acts to provides strength to ribbon 12 that resists split propagation. In one embodiment, the thickness of ribbon 12 is about 0.31 mm, and in another embodiment, the thickness of ribbon 12 is about 0.4 mm. In various embodiments, the thickness of ribbon 12 is between 0.20 mm and 0.50 mm, specifically is between 0.30 mm and 0.50 mm and more specifically is between 0.35 mm and 0.45 mm.

Figure 5A:
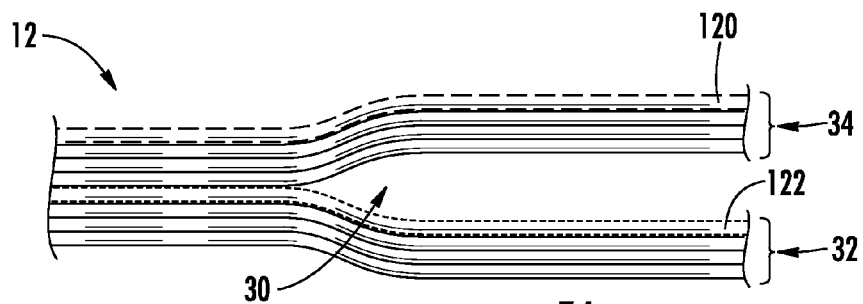
FIGS. 5A-5C show an optical fiber ribbon including a fiber indicator according to an exemplary embodiment.
Figure 5B:
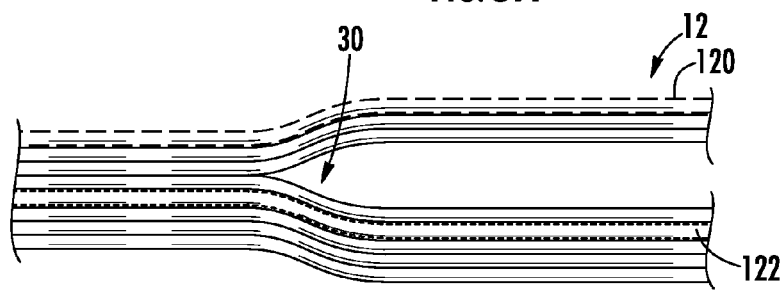
Figure 5C:
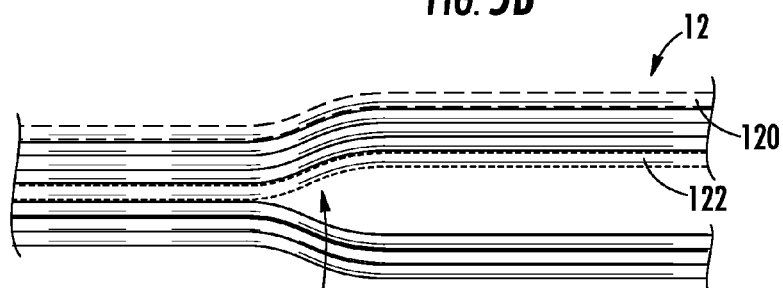

Referring to FIGS. 5A, 5B and 5C, an indicator system configured to identify the proper orientation of ribbon 12 relative to connector 18 and to allow the installer to properly place split 30, is shown according to an exemplary embodiment. As shown schematically in FIGS. 5A-5C, first fiber 120 of ribbon 12 has a visual indicator, shown as the long-dashed border lines, and fifth fiber 122 of ribbon 12 has a visual indicator, shown as the short-dashed border lines. In this embodiment, the other six fibers of ribbon 12 appear the same as each other.

As shown in FIG. 5A, the indicator of the first fiber is different from (e.g., is visually distinctive from) the indicator on the fifth fiber such that the user/installer is able to distinguish the first fiber and the fifth fiber from each other and from the other six fibers in the ribbon. Further, the indicator of first fiber 120 assists in proper connecting of ribbon 12 to connector 18 by indicating to the installer which fiber is the first fiber. By allowing the installer to properly identify the first fiber, the installer may then connect ribbon 12 to connector 18 such that the first fiber is received within proper opening of connecter 18 (e.g., within the leftmost opening of connector 18).

In addition, the indicator of the fifth fiber 122 identifies to the installer where to cut ribbon 12 to create split 30. In the embodiment shown, the indicator of fifth fiber 122 indicates to installer that the split is to be created between the fourth and fifth fiber (i.e., directly above fifth fiber 122 in the orientation of FIG. 5A). However, in other embodiments, the split indicator may be placed on any fiber of ribbon 12 to indicate that the split is to be created adjacent the fiber. Thus, because of the visual split indicator, the installer is able to visually confirm that split 30 has been created in the correct position when the indicator of fifth fiber 122 appears on the first fiber adjacent the split and is the only fiber with a distinct identifier in the fiber group as shown in FIG. 5A.

FIG. 5B and FIG. 5C provide examples illustrating how the identifiers on first fiber 120 and fifth fiber 122 can indicate the proper positioning of split 30. Referring to FIG. 5B, fifth fiber 122 indicates that split 30 is not in the proper position because the indicator shows that the fifth fiber 122 is not the first fiber adjacent the split. Referring to FIG. 5C, fifth fiber 122, in conjunction with the indicator identifying the first fiber 120, indicates that split 30 is not in the proper position because the indicators show that both fifth fiber 122 and first fiber 120 are on the same side of split 30.

In various embodiments, a variety of indicators can be associated with first fiber 120 and fifth fiber 122 to provide the indications, discussed above. For example, in one embodiment, the ink layer of first fiber 120 is a first color, the ink layer of fifth fiber 122 is a second color and the ink layers of the remaining fibers are a third color. In such embodiments three-color ribbon embodiments, the first color and the second color may be selected to be easily distinguishable from each other, and the third color may be selected to have a high level of contrast relative to the first color and the second color. In one embodiment, the third color is a light color such as white or gray, and the first and second colors are bright colors that are distinguishable from each other. In one such embodiment, the first fiber is a blue color and the fifth fiber is an orange color. In other embodiments, other types of indicators or identifiers may be used. For example in one embodiment, first fiber 120 may be printed with a pattern of long bands, fifth fiber 122 may be printed with a pattern of short bands, and the remaining fibers may be a solid color. In another embodiment, alphanumeric information or symbol may be included to identify first fiber 120 and fifth fiber 122.

In another embodiment, the fourth fiber, the fiber immediately above split 30 in the orientation of FIG. 5A, includes a visual indicator that is distinguishable from fifth fiber 122. In one such embodiment, the visual indicator on the fourth fiber is a color that is distinguishable from the color of fifth fiber 122 and is a different color from the remaining fibers of ribbon 12. Thus, split 30 is then created between the two colored fibers, the fourth and fifth fiber. In one such embodiment, the fourth fiber may include a visual indicator instead of first fiber 120 (i.e., in this embodiment first fiber 120 is the same color as the other uncolored fibers), and thus, in one such embodiment, ribbon 12 is a three-color ribbon. In another embodiment, both first fiber 120 and the fourth fiber may include a visual indicator, and thus, in one such embodiment, ribbon 12 is a four-color ribbon.

In addition to assisting placement of split 30 and orientation relative to connector 18, the indicators of the first fiber and/or fifth fiber can indicate a property of the fibers or the type of fibers within the ribbon. For example, either the first or fifth fiber may be colored yellow to indicate that ribbon 12 includes single mode fibers. As another example, either the first or fifth fiber may be colored orange to indicate that ribbon 12 includes multimode fibers. As another example, either the first or fifth fiber may be colored aqua to indicate that ribbon 12 includes laser optimized multimode fibers. As yet another example, either the first or fifth fiber may be colored green to indicate that ribbon 12 includes fibers optimized for silicon photonics applications.

While the embodiments discussed relative to FIGS. 1-5C relate primarily to an eight fiber version of ribbon 12, ribbon 12 may include any number of fibers as desired. In various embodiments, ribbon 12 includes four fibers, twelve fibers, sixteen fibers, twenty four fibers, etc. In general, regardless of the number of fibers contained within ribbon 12, a split 30 may be formed between each desired group of fibers, and in general the first fiber of each group may include an identifier as discussed above.

Figure 6:
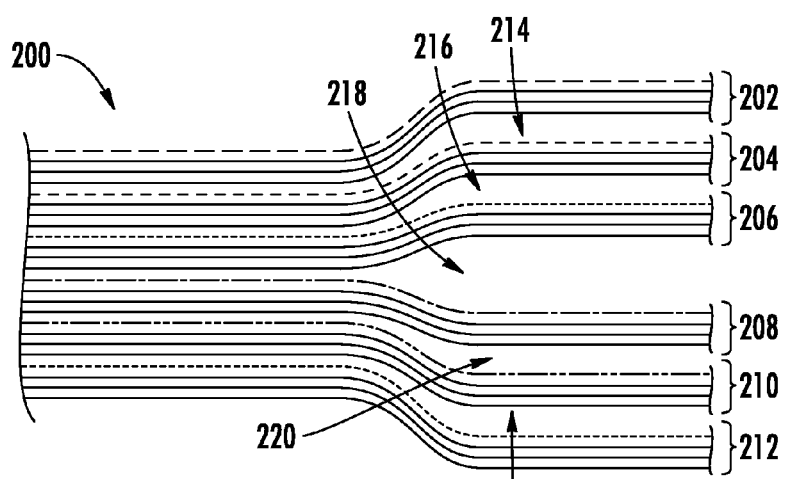
FIG. 6 shows an optical fiber ribbon according to an exemplary embodiment.

By way of example, referring to FIG. 6, a twenty-four fiber ribbon 200 is shown according to an exemplary embodiment. As shown, ribbon 200 includes six fiber groups of four fibers each, shown as groups 202, 204, 206, 208, 210 and 212. Similar to ribbon 12, the first fiber of each group includes an identifier (e.g., identifying color, pattern, etc.) that allows the installer to create splits 214, 216, 218, 220 and 222 between the appropriate fibers. In an exemplary twenty four fiber embodiment of ribbon 200 (numbering for the upper most fiber of ribbon 200), the first, fifth, ninth, $13^{th}$, $17^{th}$, and $21^{st}$ fibers each have an ink layer having an identifying color. In one embodiment, the first fiber is a blue color, the fifth fiber is yellow, the ninth fiber is orange, the $13^{th}$ fiber is yellow, the $17^{th}$ fiber is green and the $21^{st}$ fiber is yellow. In one such embodiment, the yellow coloring of the fifth fiber, $13^{th}$ fiber and $21^{st}$ fiber indicate that ribbon 200 contains single mode optical fibers.

A method for connecting an optical fiber ribbon to a circuit board is also provided according to an exemplary embodiment. An optical fiber ribbon including a plurality of parallel fibers embedded in a ribbon matrix is provided. In one embodiment, the ribbon provided is ribbon 12 or ribbon 200 discussed above. The optical fiber ribbon is split lengthwise from a first end along a portion of the length of the ribbon such that the first end of the ribbon is separated into a first group of fibers and a second group of fibers. Splitting creates an inner split terminus between the first end and the second end of the ribbon.

To continue the method, an optical connector is provided. The connector includes a body, a first outer surface, a second outer surface and a plurality of passages formed through the first outer surface and extending into the body. In one embodiment, the connector is an onboard connector such as connector 18 discussed above. The first end of the first group of fibers is moved away from the first end of the second group of fibers such that a gap is formed between the first and second group of fibers. The first ends of the first group and second group of fibers are inserted into the plurality of passages of the optical connector. The optical connector is connected to a circuit board comprising a diode array such that the second surface of the connector faces the diode array and such that the optical connector is positioned between the diode array and the inner split terminus. In one embodiment, splitting of the ribbon occurs prior to connection of the ribbon to the optical connector and/or prior to connection of the optical connector to the circuit board. A housing is provided, and then the connector and ribbon are located within the housing such that an inner split terminus of the ribbon is located within the housing but outside of the body of the connector.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical fiber may comprise an inner primary coating and an outer secondary coating. Optical fiber coatings may be applied in concentric layers.

The optical connectors discussed herein may typically comprise a ceramic material, such as, but not limited to, zirconia, alumina, titanium-doped alumina, glass-filled PPS, or combinations thereof. However, other materials of construction of the ferrule are contemplated herein, such as metals, ceramics, polymers, or combinations thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber assembly comprising:
    an optical fiber ribbon comprising:
        a ribbon matrix;
        a first group of optical fibers embedded in the ribbon matrix;
        a second group of optical fibers embedded in the ribbon matrix; and
        a split in the ribbon matrix beginning at a first end of the ribbon and ending at an inner terminus, forming a space between a first end of the first group of optical fibers and a first end of the second group of optical fibers; and
    an optical connector comprising:
        a body;
        a first array of openings defined in the body; and
        a second array of openings defined in the body, the second array spaced from the first array;
    wherein a bond between the ribbon matrix and the optical fibers provides a separation strength of between 0.8 N and 8 N at the inner terminus preventing elongation of the split due to a force applied perpendicular to the axial length of the split.

2. The optical fiber assembly of claim 1, wherein the optical connector comprises a wall portion located between and defining a separation distance between the first array of openings and the second array of openings, wherein a width of the space between the first end of the first group of optical fibers and the first end of the second group of optical fibers is substantially the same as the separation distance allowing the first group of optical fibers to align with the first array of openings and allowing the second group of optical fibers to align with the second array of openings.

3. The optical fiber assembly of claim 2, wherein the ribbon matrix binds the first group of optical fibers and the second group of optical fibers together and prevents the split from propagating toward a second end of the ribbon without restraining the ribbon at a point between the inner terminus of the split and the second end of the ribbon.

4. The optical fiber assembly of claim 1, wherein the optical fiber ribbon further comprises an ink layer on each of the optical fibers.

5. The optical fiber assembly of claim 4, wherein the ink layer on a first fiber of the first group has a first color, the ink layer on a first fiber of the second group has a second color, and the ink layer on the remaining fibers of the first and second groups have a third color, wherein the first color is different from the second and third colors, and the second color is different from the third color.

6. The optical fiber assembly of claim 5, wherein the first fiber of the first group is an outermost fiber of the first group, and the first fiber of the second group is an innermost fiber of the second group, wherein the split is located between the first fiber of the second group and an innermost fiber of the first group, wherein the difference between the second color and the third color provides a visual indication of a boundary between the first and second groups.

7. The optical fiber assembly of claim 4, wherein the ink layers are cured in an environment having an $O_2$ content in an amount of at least about 1,000 ppm and the separation strength is between 0.8 N and 4 N.

8. An optical fiber assembly comprising:
    an optical fiber ribbon comprising:
        a first end;
        a second end;
        a ribbon body comprising a matrix;
        a first fiber embedded in the ribbon body and extending from the first end to the second end;
        a second fiber embedded in the ribbon body and extending from the first end to the second end; and
        a split in the ribbon body extending along a portion of the length of the ribbon from the first end toward the second end of the ribbon, the split having an inner terminus located between the first and second ends of the ribbon, the split located between the first fiber and the second fiber forming a gap between the first fiber and the second fiber at the first end of the ribbon; and
    an optical connector comprising:
        a body including an outer surface;
        a first fiber receiving passage defined in the body and extending inward from the outer surface into the optical connector, wherein the first fiber is received within the first fiber receiving passage;
        a second fiber receiving passage defined in the body and extending inward from the outer surface into the optical connector, wherein the second fiber is received within the second fiber receiving passage;
        wherein the inner terminus of the split is located outside of the body of the optical connector;
        wherein a bond between the matrix of the ribbon body and the optical fibers has a separation strength of between 0.8 N and 8 N at the inner terminus that prevents the split from propagating toward the second end when a force is applied perpendicular to the axial length of the split.

9. The optical fiber assembly of claim 8, wherein the optical connector comprises a wall portion located between and defining a separation distance between the first fiber receiving opening and the second fiber receiving opening, wherein a width of the gap between the first fiber and the second fiber is greater than the separation distance, wherein the separation distance is between 1 mm and 3 mm.

10. The optical fiber assembly of claim 8, wherein the ribbon body binds the first fiber and the second fiber together and prevents the split from propagating toward the second end without restraining the ribbon at a point between the inner terminus of the split and the second end of the ribbon.

11. The optical fiber assembly of claim 10, further comprising:
    a first ink coloring layer on the first fiber; and
    a second ink coloring layer on the second fiber;

the first and second ink coloring layers are cured in an environment having an $O_2$ content in an amount of at least about 1,000 ppm, and wherein the bond between the matrix and the optical fibers provides a separation strength of between 0.8 N and 8 N preventing elongation of the split.

12. The optical fiber assembly of claim 8, further comprising a second connector connected to the second end of the ribbon, wherein the second end of the ribbon is unsplit such that no gap is located between the first fiber and the second fiber at the second end.

13. The optical fiber assembly of claim 12, further comprising a housing and a circuit board including a diode array, wherein the optical connector is connected to the circuit board such that the first and second fibers are in communication with the diode array, wherein the second connector extends out of the housing, and an inner terminus of the split is located within the housing between the optical connector and the second connector, wherein the assembly does not include a structure external to the ribbon that engages a portion of ribbon adjacent the inner terminus of the split that acts to physically restrain propagation of the split along a length of the ribbon.

14. A connecting assembly for connecting optical fibers to a circuit board including a transmit diode array and a receive diode array and located within a housing, the connecting assembly comprising:
  an optical connector comprising:
    a body including a first outer surface and a second outer surface;
    a first array of openings defined in the body and formed through the first outer surface of the body; and
    a second array of openings defined in the body and formed through the first outer surface of the body, the second array spaced from the first array defining a separation distance;
    wherein the optical connector is configured to be connected to the circuit board such that the second outer surface of the body faces the transmit diode array and the receive diode array; and
  an optical fiber ribbon comprising:
    a first end;
    a second end;
    a ribbon body;
    a first group of a plurality of optical fibers embedded in the ribbon body, each optical fiber of the first group received within an opening of the first array of openings;
    a second group of a plurality of optical fibers embedded in the ribbon body, each optical fiber of the second group received within an opening of the second array of openings;
    a split in the ribbon body extending along a portion of the length of the ribbon from the first end toward the second end, the split located between the first and second groups of optical fibers forming a gap therebetween, the split having an inner terminus located between the first and second ends of the ribbon, the split allowing the first group of optical fibers to align with the first array of openings and the second group of optical fibers to align with the second array of openings; and
    an ink layer on each of the optical fibers, wherein the ink layer on a first fiber of the first group has a first color, the ink layer on a first fiber of the second group has a second color, and the ink layers on the remaining fibers of the first and second groups have a third color, wherein the first color is different from the second and third colors, and the second color is different from the third color;
    wherein the first array of openings and the second array of openings are located between the second surface of the body and the inner terminus of the split; and
    wherein a bond between the ribbon matrix and the optical fibers provides a separation strength of between 0.8 N and 8 N at the inner terminus preventing elongation of the split due to a force applied perpendicular to the axial length of the split.

15. The connecting assembly of claim 14, wherein a bond between the material of the ribbon body and the optical fibers provides a separation strength of between 0.8 N and 8 N preventing elongation of the split.

16. The connecting assembly of claim 14, wherein the first array of openings has a first width and the second array of openings has a second width, wherein a width of the gap between the first group of fibers and the second group of fibers is greater than each of the first width and the second width.

17. The connecting assembly of claim 16, wherein the width of the gap is between 1.2 times and 4 times greater than the first width and the second width.

18. The connecting assembly of claim 14, wherein the ink layers are cured in an environment having an $O_2$ content in an amount of at least about 1,000 ppm.

19. A method of connecting an optical fiber ribbon to a circuit board comprising:
  providing an optical fiber ribbon including a plurality of parallel fibers embedded in a ribbon matrix;
  splitting the optical fiber ribbon lengthwise from a first end along a portion of the length of the ribbon, such that the first end of the ribbon is separated into a first group of fibers and a second group of fibers, wherein an inner split terminus is formed between the first end and a second end of the ribbon;
  providing an optical connector including a body, a first outer surface and a second outer surface and a plurality of passages formed through the first outer surface and extending into the body;
  moving the first end of the first group of fibers away from the first end of the second group of fibers such that a gap is formed between the first and second group of fibers;
  inserting the first ends of the first group and second group of fibers into the plurality of passages of the optical connector; and
  connecting the optical connector to a circuit board comprising a diode array such that the second surface of the connector faces the diode array and such that the optical connector is positioned between the diode array and the inner split terminus;
  wherein a bond between the ribbon matrix and the fibers at the inner split terminus provides a separation strength of between 0.8 N and 8 N preventing elongation of the split when subjected to a force applied perpendicular to the axial length of the split.

20. The method of claim 19 wherein the inner split terminus is located outside of the body of the connector.

21. The method of claim 19, further comprising providing a housing, wherein the inner split terminus is located outside of the body of the connector and within the housing, wherein the ribbon matrix binds the first group of optical fibers and the second group of optical fibers together and prevents the split from propagating toward a second end of the ribbon without restraining the ribbon at a point between the inner terminus and the second end of the ribbon within the housing.

* * * * *